(12) United States Patent
Batchelor et al.

(10) Patent No.: US 9,290,723 B2
(45) Date of Patent: *Mar. 22, 2016

(54) LAUNDRY DETERGENT PARTICLES

(75) Inventors: Stephen Norman Batchelor, Wirral (GB); Andrew Paul Chapple, Gwynfryn (GB); Stephen Thomas Keningley, Wirral (GB); Jennifer Sian Roseblade, Dursley (GB)

(73) Assignee: Conopco Inc., Englewood Cliffs, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/878,442

(22) PCT Filed: Sep. 1, 2011

(86) PCT No.: PCT/EP2011/065149
§ 371 (c)(1),
(2), (4) Date: Jul. 12, 2013

(87) PCT Pub. No.: WO2012/048947
PCT Pub. Date: Apr. 19, 2012

(65) Prior Publication Data
US 2013/0281348 A1    Oct. 24, 2013

(30) Foreign Application Priority Data
Oct. 14, 2010   (EP) .................................. 10187509

(51) Int. Cl.
| | | |
|---|---|---|
| C11D 17/00 | (2006.01) | |
| C11D 17/06 | (2006.01) | |
| C11D 1/83 | (2006.01) | |
| C11D 3/10 | (2006.01) | |
| C11D 3/40 | (2006.01) | |
| C11D 3/50 | (2006.01) | |
| C11D 3/04 | (2006.01) | |
| C01D 3/08 | (2006.01) | |

(52) U.S. Cl.
CPC .. C11D 3/40 (2013.01); C01D 3/08 (2013.01); C11D 3/046 (2013.01); C11D 3/10 (2013.01); C11D 17/0039 (2013.01)

(58) Field of Classification Search
USPC .......... 510/276, 349, 356, 357, 441, 442, 509
See application file for complete search history.

(56) References Cited

U.S. PATENT DOCUMENTS

| | | | |
|---|---|---|---|
| 2,480,579 A | 8/1949 | Holuba | |
| 3,521,805 A | 7/1970 | Ward | |
| 3,887,614 A | 6/1975 | Susuki et al. | |
| 3,989,635 A | 11/1976 | Toyoda | |
| 4,097,418 A | 6/1978 | Rolfes | |
| 4,269,722 A | 5/1981 | Joshi et al. | |
| 4,308,625 A | 1/1982 | Kitto | |
| 4,664,817 A | 5/1987 | Wixon | |
| 4,965,015 A * | 10/1990 | Heybourne et al. ........... 510/442 |
| 5,002,681 A | 3/1991 | Wierenga et al. | |
| 5,332,518 A | 7/1994 | Kuroda et al. | |
| 6,114,297 A | 9/2000 | Yamaguchi | |
| 6,159,920 A | 12/2000 | Ridyard | |
| 6,284,722 B1 | 9/2001 | Yamaguchi | |
| 6,472,362 B1 | 10/2002 | Appel et al. | |
| 6,521,583 B1 | 2/2003 | James et al. | |
| 6,579,838 B2 | 6/2003 | Housmekerides et al. | |
| 6,596,683 B1 | 7/2003 | Ebihara | |
| 6,653,269 B2 | 11/2003 | Housmekerides et al. | |
| 6,730,652 B1 | 5/2004 | Painter et al. | |
| 6,747,000 B2 | 6/2004 | Pearce | |
| 6,846,795 B2 | 1/2005 | Lant | |
| 6,858,572 B1 * | 2/2005 | Mort, III ....................... 510/442 |
| 7,022,660 B1 | 4/2006 | Mort et al. | |
| 7,166,567 B2 | 1/2007 | Schudel et al. | |
| 8,883,702 B2 * | 11/2014 | Bonsall et al. ................ 510/293 |
| 2001/0053757 A1 | 12/2001 | Mendez Mata et al. | |
| 2002/0198133 A1 * | 12/2002 | Behler et al. .................. 510/466 |
| 2003/0042167 A1 | 3/2003 | Balz | |
| 2004/0011693 A1 | 1/2004 | Prenger | |
| 2004/0198629 A1 | 10/2004 | Raehse | |
| 2004/0235704 A1 | 11/2004 | Wasserman | |
| 2005/0227890 A1 * | 10/2005 | Van Dijk et al. .............. 510/276 |
| 2006/0019860 A1 | 1/2006 | Cardozo | |
| 2006/0160717 A1 | 7/2006 | Itakura | |
| 2007/0249513 A1 * | 10/2007 | Mort et al. ..................... 510/445 |
| 2008/0234168 A1 * | 9/2008 | Hamelin et al. ............... 510/343 |
| 2009/0054292 A1 | 2/2009 | Menge et al. | |
| 2009/0308414 A1 | 12/2009 | Gibis | |
| 2010/0069282 A1 * | 3/2010 | Prabhat et al. ................ 510/276 |
| 2010/0069283 A1 * | 3/2010 | Prabhat et al. ................ 510/307 |
| 2010/0132704 A1 | 6/2010 | Djinovic | |

FOREIGN PATENT DOCUMENTS

| | | |
|---|---|---|
| CN | 1122361 | 5/1996 |
| CN | 1149885 | 5/1997 |

(Continued)

OTHER PUBLICATIONS

PCT International Search Report in PCT application PCT/EP2011/065149 dated Dec. 20, 2011 with Written Opinion.

(Continued)

*Primary Examiner* — Lorna M Douyon
(74) *Attorney, Agent, or Firm* — Greenberg Traurig, LLP

(57) ABSTRACT

The present invention provides a coated lenticular or disc detergent particle having perpendicular dimensions x, y and z, the particle comprises: (i) from 40 to 90 wt % surfactant selected from: anionic surfactant; and, non-ionic surfactant; (ii) from 1 to 40 wt % water soluble inorganic salts; (iii) from 0.0001 to 0.1 wt % dye, wherein the dye is selected: from anionic dyes; and, non-ionic dyes; and, (iv) from 0 to 3 wt % of perfume, wherein the inorganic salts and the dye are present on the detergent particle as a coating and the surfactant is present as a core.

20 Claims, No Drawings

(56) References Cited

FOREIGN PATENT DOCUMENTS

| | | |
|---|---|---|
| CN | 1245529 | 2/2000 |
| CN | 1256710 | 6/2000 |
| CN | 1276828 | 12/2000 |
| CN | 1311755 | 9/2001 |
| CN | 1474657 | 2/2004 |
| CN | 1912088 | 2/2007 |
| CN | 1916148 | 2/2007 |
| CN | 101213286 | 7/2008 |
| CN | 101370418 | 2/2009 |
| CN | 101670251 | 3/2010 |
| DE | 4220649 | 1/1994 |
| DE | 4313137 | 10/1994 |
| DE | 19954959 | 5/2001 |
| DE | 10044118 | 4/2002 |
| DE | 202004006632 | 9/2004 |
| DE | 102006034900 | 1/2008 |
| DE | 102006034900 A1 | 1/2008 |
| DE | 102008010085 | 8/2009 |
| EP | 0057611 A2 | 8/1982 |
| EP | 0388389 | 9/1990 |
| EP | 0391087 | 10/1990 |
| EP | 0846755 | 6/1998 |
| EP | 0877079 A1 | 11/1998 |
| EP | 0903405 | 3/1999 |
| EP | 0962424 A1 | 12/1999 |
| EP | 1081219 A2 | 3/2001 |
| EP | 2166077 A1 | 3/2010 |
| GB | 688752 | 3/1953 |
| GB | 2076011 | 11/1981 |
| GB | 2386130 | 9/2003 |
| JP | 06-087742 B | 11/1994 |
| WO | EP0567140 A1 | 10/1993 |
| WO | WO9325729 | 12/1993 |
| WO | WO9528462 | 10/1995 |
| WO | WO9842818 | 10/1998 |
| WO | WO9932599 | 7/1999 |
| WO | WO0053719 | 9/2000 |
| WO | WO0078912 A1 | 12/2000 |
| WO | WO2004022693 | 3/2004 |
| WO | WO 2006/032327 A1 * | 3/2006 |
| WO | 2008090091 A1 | 7/2008 |
| WO | WO2010069957 | 6/2010 |
| WO | WO2010084039 | 7/2010 |
| WO | WO2010122050 A2 | 10/2010 |
| WO | WO2010122051 A1 | 10/2010 |

OTHER PUBLICATIONS

European Search Report in EP application EP 10 18 7509 dated Mar. 16, 2011.
PCT International Search Report in PCT application PCT/EP2011/065124 dated Jan. 20, 2012 with Written Opinion.
European Search Report in EP application EP 10 18 7495 dated Mar. 8, 2011.
Co-pending Application: Applicant: Keningley et al., U.S. Appl. No. 13/878,444, filed Jul. 9, 2013.
PCT International Search Report in PCT application PCT/EP2011/065150 dated Dec. 16, 2011 with Written Opinion.
European Search Report in EP application EP 10 18 7511 dated Mar. 21, 2011.
Co-pending Application: Applicant: Batchelor et al., U.S. Appl. No. 13/878,447, filed Jul. 12, 2013.
PCT International Search Report in PCT application PCT/EP2011/065152 dated Dec. 15, 2011 with Written Opinion.
European Search Report in EP application EP 10 18 7512 dated Mar. 23, 2011.
Co-pending Application: Applicant: Batchelor et al., U.S. Appl. No. 13/878,448, filed Jul. 8, 2013.
PCT International Search Report in PCT application PCT/EP2011/065153 dated Dec. 5, 2011 with Written Opinion.
European Search Report in EP application EP 10 18 7513 dated Mar. 16, 2011.
Co-pending Application: Applicant: Batchelor et al., U.S. Appl. No. 13/878,450, filed Jul. 12, 2013.
PCT International Search Report in PCT application PCT/EP2011/065154 dated Dec. 16, 2011 with Written Opinion.
European Search Report in EP application EP 10 18 7514 dated Mar. 23, 2011.
Co-pending Application: Applicant: Batchelor et al., U.S. Appl. No. 13/878,451, filed Jul. 12, 2013.
PCT International Search Report in PCT application: PCT/EP2011/057309 dated Jul. 15, 2011 with Written Opinion.
European Search Report in EP application EP 10 18 7506 dated Mar. 16, 2011.
Co-pending Application: Applicant: Bonsall et al., U.S. Appl. No. 13/878,456, filed Jul. 8, 2013.
PCT International Search Report in PCT application PCT/EP2011/057310 dated Sep. 14, 2011 with Written Opinion.
Co-pending Application: Applicant: Bonsall et al., U.S. Appl. No. 13/878,459, filed Apr. 9, 2013.
PCT International Search Report in PCT application PCT/EP2011/063748 dated Nov. 9, 2011 with Written Opinion.
European Search Report in EP application EP 10 18 7494 dated Mar. 4, 2011.
Co-pending Application: Applicant: Bonsall et al., U.S. Appl. No. 13/878,440, filed Jul. 18, 2013.
PCT International Search Report in PCT application PCT/EP2011/067735 dated Jan. 23, 2012 with Written Opinion.
European Search Report in EP application EP 10 18 7520 dated Mar. 7, 2011.
PCT International Search Report in PCT application PCT/EP2011/067159 dated Jan. 25, 2012 with Written Opinion.
European Search Report in EP application EP 10 18 7500 dated Mar. 28, 2011.
Anonymous, Physical Properties in sugar esters, Physical Properties in sugar esters, Dec. 27, 2001, 1-3.
Kilcast et al., Sensory perception of creaminess and its relationship with food structure, Food Quality and Preference, Jun. 20, 2002, 609-623, 13.
Nelen, Sucrose Esters, Emulsifiers in Food Technology, 2004, 131-161, Chapter 6, Blackwell Publishing Ltd, GB.
W. Herbst et al, Industrial Organic Pigments, Industrial Organic Pigments, Dec. 1992, Index.

* cited by examiner

LAUNDRY DETERGENT PARTICLES

FIELD OF INVENTION

The present invention relates to large laundry detergent particles.

BACKGROUND OF INVENTION

WO9932599 describes a method of manufacturing laundry detergent particles, being an extrusion method in which a builder and surfactant, the latter comprising as a major component a sulphated or sulphonated anionic surfactant, are fed into an extruder, mechanically worked at a temperature of at least 40° C., preferably at least 60° C., and extruded through an extrusion head having a multiplicity of extrusion apertures. In most examples, the surfactant is fed to the extruder along with builder in a weight ratio of more than 1 part builder to 2 parts surfactant. The extrudate apparently required further drying. In Example 6, PAS paste was dried and extruded. Such PAS noodles are well known in the prior art. The noodles are typically cylindrical in shape and their length exceeds their diameter, as described in example 2.

U.S. Pat. No. 7,022,660 discloses a process for the preparation of a detergent particle having a coating.

SUMMARY OF THE INVENTION

We have found that it is possible to have a dye containing coating that give reduced staining. The invention may also increase the photostability of the dye in the product on storage.

In one aspect the present invention provides a coated detergent particle having perpendicular dimensions x, y and z, wherein x is from 1 to 2 mm, y is from 2 to 8 mm (preferably 3 to 8 mm), and z is from 2 to 8 mm (preferably 3 to 8 mm), wherein the particle comprises:
(i) from 40 to 90 wt %, preferably 50 to 90 wt %, surfactant selected from: anionic surfactant; and, non-ionic surfactant;
(ii) from 1 to 40 wt %, preferably 20 to 40 wt %, water soluble inorganic salts;
(iii) from 0.0001 to 0.1 wt % dye, preferably 0.001 to 0.01 wt % dye, wherein the dye is selected: from anionic dyes; and, non-ionic dyes;
(iv) from 0 to 3 wt %, preferably 0.001 to 3 wt %, of a perfume, and,
wherein the inorganic salts and the dye are present on the laundry detergent particle as a coating and the surfactant is present as a core.

Unless otherwise stated all wt % refer to the total percentage in the particle as dry weights.

In a further aspect, the present invention provides a coated detergent particle that is a concentrated formulation with more surfactant than inorganic solid. Only by having the coating encasing the surfactant which is soft can one have such a particulate concentrate where the unit dose required for a wash is reduced. Adding solvent to the core would result by converting the particle into a liquid formulation. On the other hand, having a greater amount of inorganic solid would result in a less concentrated formulation; a high inorganic content would take one back to conventional low surfactant concentration granular powder. The coated detergent particle of the present invention sits in the middle of the two conventional (liquid and granular) formats.

DETAILED DESCRIPTION OF THE INVENTION

Shape

Preferably the coated laundry detergent particle is curved.

The coated laundry detergent particle may be lenticular (shaped like a whole dried lentil), an oblate ellipsoid, where z and y are the equatorial diameters and x is the polar diameter; preferably y=z.

The coated laundry detergent particle may be shaped as a disc.

Preferably the coated laundry detergent particle does not have hole; that is to say, the coated laundry detergent particle does not have a conduit passing there though that passes through the core, i.e., the coated detergent particle has a topologic genus of zero.

Core

Surfactant

The coated laundry detergent particle comprises between 40 to 90 wt %, preferably 50 to 90 wt % of a surfactant, most preferably 70 to 90 wt %. In general, the nonionic and anionic surfactants of the surfactant system may be chosen from the surfactants described "Surface Active Agents" Vol. 1, by Schwartz & Perry, Interscience 1949, Vol. 2 by Schwartz, Perry & Berch, Interscience 1958, in the current edition of "McCutcheon's Emulsifiers and Detergents" published by Manufacturing Confectioners Company or in "Tenside-Taschenbuch", H. Stache, 2nd Edn., Carl Hauser Verlag, 1981. Preferably the surfactants used are saturated.

Anionic Surfactants

Suitable anionic detergent compounds which may be used are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher $C_8$ to $C_{18}$ alcohols, produced for example from tallow or coconut oil, sodium and potassium alkyl $C_9$ to $C_{20}$ benzene sulphonates, particularly sodium linear secondary alkyl $C_{10}$ to $C_{15}$ benzene sulphonates; and sodium alkyl glyceryl ether sulphates, especially those ethers of the higher alcohols derived from tallow or coconut oil and synthetic alcohols derived from petroleum. Most preferred anionic surfactants are sodium lauryl ether sulfate (SLES), particularly preferred with 1 to 3 ethoxy groups, sodium $C_{10}$ to $C_{15}$ alkyl benzene sulphonates and sodium $C_{12}$ to $C_{18}$ alkyl sulphates. Also applicable are surfactants such as those described in EP-A-328 177 (Unilever), which show resistance to salting-out, the alkyl polyglycoside surfactants described in EP-A-070 074, and alkyl monoglycosides. The chains of the surfactants may be branched or linear.

Soaps may also be present. The fatty acid soap used preferably contains from about 16 to about 22 carbon atoms, preferably in a straight chain configuration. The anionic contribution from soap is preferably from 0 to 30 wt % of the total anionic.

Preferably, at least 50 wt % of the anionic surfactant is selected from: sodium $C_{11}$ to $C_{15}$ alkyl benzene sulphonates; and, sodium $C_{12}$ to $C_{18}$ alkyl sulphates. Even more preferably, the anionic surfactant is sodium $C_{11}$ to $C_{15}$ alkyl benzene sulphonates.

Preferably the anionic surfactant is present in the coated laundry detergent particle at levels between 15 to 85 wt %, more preferably 50 to 80 wt % on total surfactant.

Nonionic Surfactants

Suitable nonionic detergent compounds which may be used include, in particular, the reaction products of compounds having a hydrophobic group and a reactive hydrogen atom, for example, aliphatic alcohols, acids, amides or alkyl phenols with alkylene oxides, especially ethylene oxide either alone or with propylene oxide. Preferred nonionic detergent compounds are $C_6$ to $C_{22}$ alkyl phenol-ethylene oxide condensates, generally 5 to 25 EO, i.e. 5 to 25 units of ethylene oxide per molecule, and the condensation products of aliphatic $C_8$ to $C_{18}$ primary or secondary linear or branched alcohols with ethylene oxide, generally 5 to 50 EO. Preferably, the non-ionic is 10 to 50 EO, more preferably 20 to 35 EO. Alkyl ethoxylates are particularly preferred.

Preferably the nonionic surfactant is present in the coated laundry detergent particle at levels between 5 to 75 wt %, on total surfactant, more preferably 10 to 40 wt % on total surfactant.

Cationic surfactant may be present as minor ingredients at levels preferably between 0 to 5 wt % on total surfactant.

Preferably all the surfactants are mixed together before being dried. Conventional mixing equipment may be used. The surfactant core of the laundry detergent particle may be formed by extrusion or roller compaction and subsequently coated with an inorganic salt.

Calcium Tolerant Surfactant System

In another aspect the surfactant system used is calcium tolerant and this is a preferred aspect because this reduces the need for builder.

Surfactant blends that do not require builders to be present for effective detergency in hard water are preferred. Such blends are called calcium tolerant surfactant blends if they pass the test set out hereinafter. However, the invention may also be of use for washing with soft water, either naturally occurring or made using a water softener. In this case, calcium tolerance is no longer important and blends other than calcium tolerant ones may be used.

Calcium-tolerance of the surfactant blend is tested as follows:

The surfactant blend in question is prepared at a concentration of 0.7 g surfactant solids per liter of water containing sufficient calcium ions to give a French hardness of 40 ($4 \times 10^{-3}$ Molar $Ca^{2+}$). Other hardness ion free electrolytes such as sodium chloride, sodium sulphate, and sodium hydroxide are added to the solution to adjust the ionic strength to 0.05M and the pH to 10. The adsorption of light of wavelength 540 nm through 4 mm of sample is measured 15 minutes after sample preparation. Ten measurements are made and an average value is calculated. Samples that give an absorption value of less than 0.08 are deemed to be calcium tolerant.

Examples of surfactant blends that satisfy the above test for calcium tolerance include those having a major part of LAS surfactant (which is not of itself calcium tolerant) blended with one or more other surfactants (co-surfactants) that are calcium tolerant to give a blend that is sufficiently calcium tolerant to be usable with little or no builder and to pass the given test. Suitable calcium tolerant co-surfactants include SLES 1-7EO, and alkyl-ethoxylate nonionic surfactants, particularly those with melting points less than 40° C.

A LAS/SLES surfactant blend has a superior foam profile to a LAS nonionic surfactant blend and is therefore preferred for hand washing formulations requiring high levels of foam. SLES may be used at levels of up to 30 wt % of the surfactant blend.

Water-soluble Inorganic Salts

The water-soluble inorganic salts are preferably selected from sodium carbonate, sodium chloride, sodium silicate and sodium sulphate, or mixtures thereof, most preferably, 70 to 100 wt % sodium carbonate on total water-soluble inorganic salts. The water-soluble inorganic salt is present as a coating on the particle. The water-soluble inorganic salt is preferably present at a level that reduces the stickiness of the laundry detergent particle to a point where the particles are free flowing.

It will be appreciated by those skilled in the art that while multiple layered coatings, of the same or different coating materials, could be applied, a single coating layer is preferred, for simplicity of operation, and to maximise the thickness of the coating. The amount of coating should lay in the range 1 to 40 wt % of the particle, preferably 20 to 40 wt %, more preferably 25 to 35 wt % for the best results in terms of anti-caking properties of the detergent particles.

The coating is preferably applied to the surface of the surfactant core, by deposition from an aqueous solution of the water soluble inorganic salt. In the alternative coating can be performed using a slurry. The aqueous solution preferably contains greater than 50 g/L, more preferably 200 g/L of the salt. An aqueous spray-on of the coating solution in a fluidised bed has been found to give good results and may also generate a slight rounding of the detergent particles during the fluidisation process. Drying and/or cooling may be needed to finish the process.

A preferred calcium tolerant coated laundry detergent particle comprises 15 to 100 wt % on surfactant of anionic surfactant of which 20 to 30 wt % on surfactant is sodium lauryl ether sulphate.

Dye

Dyes are described in Industrial Dyes edited by K. Hunger 2003 Wiley-VCH ISBN 3-527-30426-6.

Dyes for use in the current invention are selected from anionic and non-ionic dyes Anionic dyes are negatively charged in an aqueous medium at pH 7. Examples of anionic dyes are found in the classes of acid and direct dyes in the Color Index (Society of Dyers and Colourists and American Association of Textile Chemists and Colorists). Anionic dyes preferably contain at least one sulphonate or carboxylate groups. Non-ionic dyes are uncharged in an aqueous medium at pH 7, examples are found in the class of disperse dyes in the Color Index.

The dyes may be alkoxylated. Alkoxylated dyes are preferably of the following generic form: Dye-$NR_1R_2$. The $NR_1R_2$ group is attached to an aromatic ring of the dye. $R_1$ and $R_2$ are independently selected from polyoxyalkylene chains having 2 or more repeating units and preferably having 2 to 20 repeating units. Examples of polyoxyalkylene chains include ethylene oxide, propylene oxide, glycidol oxide, butylene oxide and mixtures thereof.

A preferred polyoxyalkylene chain is $[(CH_2CR_3HO)_x (CH_2CR_4HO)_y R_5)$] in which $x+y \leq 5$ wherein $y \geq 1$ and $z=0$ to 5, $R_3$ is selected from: H; $CH_3$; $CH_2O(CH_2CH_2O)_zH$ and mixtures thereof; $R_4$ is selected from: H; $CH_2O(CH_2CH_2O)_zH$ and mixtures thereof; and, $R_5$ is selected from: H; and, $CH_3$.

A preferred alkoxylated dye for use in the invention is:

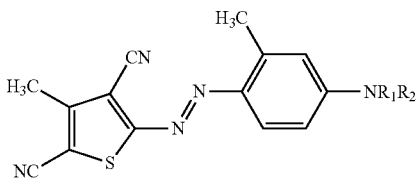

Preferably the dye is selected from acid dyes; disperse dyes and alkoxylated dyes.

Most preferably the dye is a non-ionic dye.

Preferably the dye is selected from those having: anthraquinone; mono-azo; bis-azo; xanthene; phthalocyanine; and, phenazine chromophores. More Preferably the dye is selected from those having: anthraquinone and, mono-azo chromophores.

The dye is added to the coating slurry and agitated before applying to the core of the particle. Application may be by any suitable method, preferably spraying on to the core particle as detailed above.

The dye may be any colour, preferable the dye is blue, violet, green or red. Most preferably the dye is blue or violet.

Preferably the dye is selected from: acid blue 80, acid blue 62, acid violet 43, acid green 25, direct blue 86, acid blue 59, acid blue 98, direct violet 9, direct violet 99, direct violet 35, direct violet 51, acid violet 50, acid yellow 3, acid red 94, acid red 51, acid red 95, acid red 92, acid red 98, acid red 87, acid yellow 73, acid red 50, acid violet 9, acid red 52, food black 1, food black 2, acid red 163, acid black 1, acid orange 24, acid yellow 23, acid yellow 40, acid yellow 11, acid red 180, acid red 155, acid red 1, acid red 33, acid red 41, acid red 19, acid orange 10, acid red 27, acid red 26, acid orange 20, acid orange 6, sulphonated Al and Zn phthalocyanines, solvent violet 13, disperse violet 26, disperse violet 28, solvent green 3, solvent blue 63, disperse blue 56, disperse violet 27, solvent yellow 33, disperse blue 79:1.

The dye is preferably a shading dye for imparting a perception of whiteness to a laundry textile, preferably acid violet 50, solvent violet 13, disperse violet 27, disperse violet 28, an alkoxylated thiophene, or a cationic phenazine as described in WO 2009/141172 and WO 2009/141173. When a shading dye is present, preferably a further green dye is present to shift the colour of the particle from violet to blue-green.

The dye may be covalently bound to polymeric species.

A combination of dyes may be used.

The Coated Laundry Detergent Particle

Preferably, the coated laundry detergent particle comprises from 10 to 100 wt %, more preferably 50 to 100 wt %, even more preferably 80 to 100 wt %, most preferably 90 to 100 wt % of a laundry detergent formulation in a package.

The package is that of a commercial formulation for sale to the general public and is preferably in the range of 0.01 kg to 5 kg, preferably 0.02 kg to 2 kg, most preferably 0.5 kg to 2 kg.

Preferably, the coated laundry detergent particle is such that at least 90 to 100% of the coated laundry detergent particles in the in the x, y and z dimensions are within a 20%, preferably 10%, variable from the largest to the smallest coated laundry detergent particle.

Water Content

The particle preferably comprises from 0 to 15 wt % water, more preferably 0 to 10 wt %, most preferably from 1 to 5 wt % water, at 293K and 50% relative humidity. This facilitates the storage stability of the particle and its mechanical properties.

Other Adjuncts

The adjuncts as described below may be present in the coating or the core. These may be in the core or the coating.

Fluorescent Agent

The coated laundry detergent particle preferably comprises a fluorescent agent (optical brightener). Fluorescent agents are well known and many such fluorescent agents are available commercially. Usually, these fluorescent agents are supplied and used in the form of their alkali metal salts, for example, the sodium salts. The total amount of the fluorescent agent or agents used in the composition is generally from 0.005 to 2 wt %, more preferably 0.01 to 0.1 wt %. Suitable Fluorescer for use in the invention are described in chapter 7 of Industrial Dyes edited by K. Hunger 2003 Wiley-VCH ISBN 3-527-30426-6.

Preferred fluorescers are selected from the classes distyryl-biphenyls, triazinylaminostilbenes, bis(1,2,3-triazol-2-yl) stilbenes, bis(benzo[b]furan-2-yl)biphenyls, 1,3-diphenyl-2-pyrazolines and courmarins. The fluorescer is preferably sulfonated.

Preferred classes of fluorescer are: Di-styryl biphenyl compounds, e.g. Tinopal (Trade Mark) CBS-X, Di-amine stilbene di-sulphonic acid compounds, e.g. Tinopal DMS pure Xtra and Blankophor (Trade Mark) HRH, and Pyrazoline compounds, e.g. Blankophor SN. Preferred fluorescers are: sodium 2 (4-styryl-3-sulfophenyl)-2H-napthol[1,2-d]triazole, disodium 4,4'-bis{[(4-anilino-6-(N methyl-N-2 hydroxyethyl) amino 1,3,5-triazin-2-yl)]amino}stilbene-2-2' disulfonate, disodium 4,4'-bis{[(4-anilino-6-morpholino-1, 3,5-triazin-2-yl)]amino}stilbene-2-2' disulfonate, and disodium 4,4'-bis(2-sulfostyryl)biphenyl.

Tinopal® DMS is the disodium salt of disodium 4,4'-bis{[(4-anilino-6-morpholino-1,3,5-triazin-2-yl)] amino}stilbene-2-2' disulfonate. Tinopal® CBS is the disodium salt of disodium 4,4'-bis(2-sulfostyryl)biphenyl.

Perfume

Preferably the composition comprises a perfume. The perfume is preferably in the range from 0.001 to 3 wt %, most preferably 0.1 to 1 wt %. Many suitable examples of perfumes are provided in the CTFA (Cosmetic, Toiletry and Fragrance Association) 1992 International Buyers Guide, published by CFTA Publications and OPD 1993 Chemicals Buyers Directory 80th Annual Edition, published by Schnell Publishing Co.

It is commonplace for a plurality of perfume components to be present in a formulation. In the compositions of the present invention it is envisaged that there will be four or more, preferably five or more, more preferably six or more or even seven or more different perfume components.

In perfume mixtures preferably 15 to 25 wt % are top notes. Top notes are defined by Poucher (Journal of the Society of Cosmetic Chemists 6(2):80 [1955]). Preferred top-notes are selected from citrus oils, linalool, linalyl acetate, lavender, dihydromyrcenol, rose oxide and cis-3-hexanol.

The perfume serves to disaggregate the dye to make the dye more visible.

It is preferred that the coated laundry detergent particle does not contain a peroxygen bleach, e.g., sodium percarbonate, sodium perborate, and peracid.

Polymers

The composition may comprise one or more further polymers. Examples are carboxymethylcellulose, poly(ethylene glycol), poly(vinyl alcohol), polyethylene imines, ethoxylated polyethylene imines, water soluble polyester polymers polycarboxylates such as polyacrylates, maleic/acrylic acid copolymers and lauryl methacrylate/acrylic acid copolymers.

Enzymes

One or more enzymes are preferred present in a composition of the invention.

Preferably the level of each enzyme is from 0.0001 wt % to 0.5 wt % protein on product.

Especially contemplated enzymes include proteases, alpha-amylases, cellulases, lipases, peroxidases/oxidases, pectate lyases, and mannanases, or mixtures thereof.

Suitable lipases include those of bacterial or fungal origin. Chemically modified or protein engineered mutants are included. Examples of useful lipases include lipases from *Humicola* (synonym *Thermomyces*), e.g. from *H. lanuginosa* (*T. lanuginosus*) as described in EP 258 068 and EP 305 216 or from *H. insolens* as described in WO 96/13580, a *Pseudomonas* lipase, e.g. from *P. alcaligenes* or *P. pseudoalcaligenes* (EP 218 272), *P. cepacia* (EP 331 376), *P. stutzeri* (GB 1,372,034), *P. fluorescens, Pseudomonas* sp. strain SD 705 (WO 95/06720 and WO 96/27002), *P. wisconsinensis* (WO 96/12012), a *Bacillus* lipase, e.g. from *B. subtilis* (Dartois et al. (1993), Biochemica et Biophysica Acta, 1131, 253-360), *B. stearothermophilus* (JP 64/744992) or *B. pumilus* (WO 91/16422).

Other examples are lipase variants such as those described in WO 92/05249, WO 94/01541, EP 407 225, EP 260 105, WO 95/35381, WO 96/00292, WO 95/30744, WO 94/25578, WO 95/14783, WO 95/22615, WO 97/04079 and WO 97/07202, WO 00/60063, WO 09/107,091 and WO09/111,258.

Preferred commercially available lipase enzymes include Lipolase™ and Lipolase Ultra™, Lipex™ (Novozymes A/S) and Lipoclean™.

The method of the invention may be carried out in the presence of phospholipase classified as EC 3.1.1.4 and/or EC 3.1.1.32. As used herein, the term phospholipase is an enzyme which has activity towards phospholipids.

Phospholipids, such as lecithin or phosphatidylcholine, consist of glycerol esterified with two fatty acids in an outer (sn-1) and the middle (sn-2) positions and esterified with phosphoric acid in the third position; the phosphoric acid, in turn, may be esterified to an amino-alcohol. Phospholipases are enzymes which participate in the hydrolysis of phospholipids. Several types of phospholipase activity can be distinguished, including phospholipases $A_1$ and $A_2$ which hydrolyze one fatty acyl group (in the sn-1 and sn-2 position, respectively) to form lysophospholipid; and lysophospholipase (or phospholipase B) which can hydrolyze the remaining fatty acyl group in lysophospholipid. Phospholipase C and phospholipase D (phosphodiesterases) release diacyl glycerol or phosphatidic acid respectively.

Suitable proteases include those of animal, vegetable or microbial origin. Microbial origin is preferred. Chemically modified or protein engineered mutants are included. The protease may be a serine protease or a metallo protease, preferably an alkaline microbial protease or a trypsin-like protease. Preferred commercially available protease enzymes include Alcalase™, Savinase™, Primase™, Duralase™, Dyrazym™, Esperase™, Everlase™, Polarzyme™, and Kannase™, (Novozymes A/S), Maxatase™, Maxacal™, Maxapem™, Properase™, Purafect™, Purafect OxP™, FN2™, and FN3™ (Genencor International Inc.).

The method of the invention may be carried out in the presence of cutinase. classified in EC 3.1.1.74. The cutinase used according to the invention may be of any origin. Preferably cutinases are of microbial origin, in particular of bacterial, of fungal or of yeast origin.

Suitable amylases (alpha and/or beta) include those of bacterial or fungal origin. Chemically modified or protein engineered mutants are included. Amylases include, for example, alpha-amylases obtained from *Bacillus*, e.g. a special strain of *B. licheniformis*, described in more detail in GB 1,296,839, or the *Bacillus* sp. strains disclosed in WO 95/026397 or WO 00/060060. Commercially available amylases are Duramyl™, Termamyl™, Termamyl Ultra™, Natalase™, Stainzyme™, Fungamyl™ and BAN™ (Novozymes A/S), Rapidase™ and Purastar™ (from Genencor International Inc.).

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g. the fungal cellulases produced from *Humicola insolens, Thielavia terrestris, Myceliophthora thermophila,* and *Fusarium oxysporum* disclosed in U.S. Pat. Nos. 4,435,307, 5,648,263, 5,691,178, 5,776,757, WO 89/09259, WO 96/029397, and WO 98/012307. Commercially available cellulases include Celluzyme™, Carezyme™, Endolase™, Renozyme™ (Novozymes A/S), Clazinase™ and Puradax HA™ (Genencor International Inc.), and KAC-500(B)™ (Kao Corporation).

Suitable peroxidases/oxidases include those of plant, bacterial or fungal origin. Chemically modified or protein engineered mutants are included. Examples of useful peroxidases include peroxidases from *Coprinus*, e.g. from *C. cinereus*, and variants thereof as those described in WO 93/24618, WO 95/10602, and WO 98/15257. Commercially available peroxidases include Guardzyme™ and Novozym™ 51004 (Novozymes A/S).

Further enzymes suitable for use are disclosed in WO2009/087524, WO2009/090576, WO2009/148983 and WO2008/007318.

Enzyme Stabilizers

Any enzyme present in the composition may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in e.g. WO 92/19709 and WO 92/19708.

Where alkyl groups are sufficiently long to form branched or cyclic chains, the alkyl groups encompass branched, cyclic and linear alkyl chains. The alkyl groups are preferably linear or branched, most preferably linear.

The indefinite article "a" or "an" and its corresponding definite article "the" as used herein means at least one, or one or more, unless specified otherwise. The singular encompasses the plural unless otherwise specified.

Sequesterants may be present in the coated laundry detergent particles.

It is preferred that the coated detergent particle has a core to shell ratio of from 3 to 1:1, most preferably 2.5 to 1.5:1; the optimal ratio of core to shell is 2:1.

EXPERIMENTAL

LAS refers to linear alkyl benzene sulphonate. PAS refers to primary alkyl sulphate. NI refers to an ethoylated alcohol non-ionic surfactant having an average of 30 ethoylated units and an alkyl chain of C12-14. Specifically the following were used LAS—UFASAN 65 ex Unger, PAS—Stepanol CFAS70 ex Stepan and NI—Leutensol AO 30 ex BASF.

Example 1

Particle Manufacture

Two coated laundry detergent particle colour were created containing Acid Violet 50 such that:
Particle 1 contain Acid Violet 50 in the core (reference)
Particle 2 contains Acid Violet 50 in a carbonate coating
The particles were oblate elipisoids which had the following dimension x=1.1 mm y=4.0 mm z=5.0 mm.
The particles weighed ~0.013 g each.
Particle 1 appeared violet to the eye, particle 2 appear off-white to the eye.

Preparation of Core of Particle 1

1962.5 g of dried, milled surfactant blend (LAS/PAS/NI 68/17/15 by weight) was thoroughly mixed with 37.38 g of perfume oil and 0.124 g of Acid Violet 50 dye. The mixture was then extruded using a ThermoFisher 24HC twin screw extruder, operated at a rate of 8 kg/hr. Inlet temperature of the extruder was set at 20° C., rising to 40° C. just prior to the die-plate. The die-plate used was drilled with 6 circular orifices of 5 mm diameter.

The extruded product was cut after the die-plate using a high speed cutter set up to produce particle with a thickness of ~1.1 mm.

Coating of Particle 1

764 g of the extrudates above were charged to the fluidising chamber of a Strea 1 laboratory fluid bed drier (Aeromatic-Fielder AG) and spray coated using 1069 g of a solution containing 320.7 g of sodium carbonate in 748.3 g of water, using a top-spray configuration.

The coating solution was fed to the spray nozzle of the Strea 1 via a peristaltic pump (Watson-Marlow model 101U/R) at an initial rate of 3.3 g/min, rising to 9.1 g/min during the course of the coating trial.

The Fluid bed coater was operated with an initial air inlet air temperature of 55° C. increasing to 90° C. during the course of the coating trial whilst maintaining the outlet temperature in the range 45-50° C. throughout the coating process.

Preparation of core of Particle 2

1962.9 g of dried, milled surfactant blend (LAS/PAS/NI 68/17/15 by weight) was mixed with 37.38 g of perfume oil and the mixture extruded using a ThermoFisher 24HC twin screw extruder, operated at a rate of 8 kg/hr. Inlet temperature of the extruder was set at 20° C., rising to 40° C. just prior to the die-plate. The die-plate used was drilled with 6 circular orifices of 5 mm diameter.

The extruded product was cut after the die-plate using a high speed cutter set up to produce particle with a thickness of ~1.1 mm.

Coating of Particle 2

715 g of the extrudates above were charged to the fluidising chamber of a Strea 1 laboratory fluid bed drier (Aeromatic-Fielder AG) and spray coated using 1000 g of a solution containing of 300 g sodium carbonate in 0.09 g Acid Violet 50 and 669.91 of water using a top-spray configuration.

The coating solution was fed to the spray nozzle of the Strea 1 via a peristaltic pump (Watson-Marlow model 101U/R) at an initial rate of 2.7 g/min, rising to 25 g/min during the course of the coating trial.

The Fluid bed coater was operated with an initial air inlet air temperature of 60° C. increasing to 75° C. during the course of the coating trial whilst maintaining the outlet temperature in the range 47-52° C. throughout the coating process.

Example 2

Liquor Colour 2.04 g of Particle 2 and 2.25 of Particle 1 were separately dissolved in 100 ml of deminerailised water. The solutions were centrifuged at 15 minutes for 11000 RPM and the colour of the liquid measured on A UV-VIS absorption spectrometer. Both liquid appeared violet to the eye.

The UV-VIS spectrum gave the spectrum of Acid Violet 50 for both solutions with a maximum absorption at 570 nm. The optical densities are given in the table below:

|  | Optical density (5 cm) at 570 nm |
| --- | --- |
| Particle 1: Dye in Core (Reference) | 0.175 |
| Particle 2: Dye in Coating | 0.155 |

Both particles effectively deliver Acid Violet 50 to solution.

Example 3

Staining 25 of each particle were scattered on to a 20 by 20 cm piece of white woven cotton which was submerged in 500 ml of demineralised water such that the cloth were covered by 2 cm of water. The particles were left for 40 minutes then the cloth washed, rinsed and dried. The number of stains on each cloth was counted and the % staining calculated. % staining is the fraction of particles that give rise to stains:

% stains=100×(number of stains)/(number of particles)

The results are given in the table below:

|  | % staining |
| --- | --- |
| Particle 1 Dye in Core (Reference) | 12 |
| Particle 2 Dye in Coating | 4 |

Surprisingly the particle with the dye in the coating shows lowest staining.

Example 4

Particle Manufacture

Two coated laundry detergent particle colour were created containing Acid Violet 50 such that:
Particle 3 contain Acid Violet 50 in the core (reference)
Particle 4 contains Acid Violet 50 in a carbonate coating
The particles were oblate elipisoids which had the following dimension x=1.1 mm y=4.0 mm z=5.0 mm.
The particles weighed ~0.013 g each.

Preparation of Core of Particle 3 (Reference)

2000 g of dried, milled surfactant blend (LAS/PAS/NI 68/17/15 by weight) was thoroughly mixed with 0.124 g of Acid Violet 50 dye. The mixture was then extruded using a ThermoFisher 24HC twin screw extruder, operated at a rate of 8 kg/hr. Inlet temperature of the extruder was set at 20° C., rising to 40° C. just prior to the die-plate. The die-plate used was drilled with 6 circular orifices of 5 mm diameter.

The extruded product was cut after the die-plate using a high speed cutter set up to produce particle with a thickness of ~1.1 mm.

Coating of Particle 3 (Reference)

764 g of the extrudates above were charged to the fluidising chamber of a Strea 1 laboratory fluid bed drier (Aeromatic-Fielder AG) and spray coated using 1069 g of a solution containing 320.7 g of sodium carbonate in 748.3 g of water, using a top-spray configuration.

The coating solution was fed to the spray nozzle of the Strea 1 via a peristaltic pump (Watson-Marlow model 101U/R) at an initial rate of 3.3 g/min, rising to 9.1 g/min during the course of the coating trial.

The Fluid bed coater was operated with an initial air inlet air temperature of 55° C. increasing to 90° C. during the course of the coating trial whilst maintaining the outlet temperature in the range 45-50° C. throughout the coating process.

Preparation of Core of Particle 4

2000 g of dried, milled surfactant blend (LAS/PAS/NI 68/17/15 by weight) was extruded using a ThermoFisher 24HC twin screw extruder, operated at a rate of 8 kg/hr. Inlet temperature of the extruder was set at 20° C., rising to 40° C. just prior to the die-plate. The die-plate used was drilled with 6 circular orifices of 5 mm diameter.

The extruded product was cut after the die-plate using a high speed cutter set up to produce particle with a thickness of ~1.1 mm.

Coating of Particle 4

715 g of the extrudates above were charged to the fluidising chamber of a Strea 1 laboratory fluid bed drier (Aeromatic-Fielder AG) and spray coated using 1000 g of a solution containing of 300 g sodium carbonate in 0.09 g Acid Violet 50 and 669.91 of water using a top-spray configuration.

The coating solution was fed to the spray nozzle of the Strea 1 via a peristaltic pump (Watson-Marlow model 101U/R) at an initial rate of 2.7 g/min, rising to 25 g/min during the course of the coating trial.

The Fluid bed coater was operated with an initial air inlet air temperature of 60° C. increasing to 75° C. during the course of the coating trial whilst maintaining the outlet temperature in the range 47-52° C. throughout the coating process.

Example 5

Liquor Colour 2.04 g of Particle 3 and 2.04 of Particle 4 were separately dissolved in 100 ml of demenrailised water. The solutions were centrifuged at 15 minutes for 11000 RPM and the colour of the liquid measured on A UV-VIS absorption spectrometer. Both liquid appeared violet to the eye.

The UV-VIS spectrum gave the spectrum of Acid Violet 50 for both solutions with a maximum absorption at 570 nm. The optical densities are given in the table below:

|  | Optical density (5 cm) at 570 nm |
| --- | --- |
| Particle 3: Dye in Core (Reference) | 0.15 |
| Particle 4: Dye in Coating | 0.18 |

Both particles effectively deliver Acid Violet 50 to solution.

Example 6

Spotting 25 of each particle were scattered on to a 20 by 20 cm piece of white woven cotton which was submerged in 500 ml of demineralised water such that the cloth were covered by 2 cm of water. The particles were left for 40 minutes then the cloth washed, rinsed and dried. The number of spots on each cloth was counted and the % spotting calculated. % spotting is the fraction of particles that give rise to spots:

% spotting=100×(number of spots)/(number of particles)

The results are given in the table below:

|  | % spotting |
| --- | --- |
| Particle 3 Dye in Core (Reference) | 12 |
| Particle 4 Dye in Coating | 0 |

Surprisingly the particle with the dye in the coating shows lowest spotting.

The particles did not contain perfume.

We claim:

1. A coated detergent particle having perpendicular dimensions x, y and z, wherein x is from 1 to 2 mm, y is from 2 to 8 mm, and z is from 2 to 8 mm, wherein x is not equal to y and z, and wherein the particle consists of:
 a core consisting of surfactant, and optionally, at least one of soap, water, fluorescent agent, perfume, carboxymethylcellulose, polyethylene glycol, polyvinyl alcohol, polyethylene imine, ethoxylated polyethylene imine, water soluble polyester polymer, polycarboxylate, polyacrylate, maleic/acrylic acid copolymer, lauryl methacrylate/acrylic acid copolymer, enzyme, or enzyme stabilizer; and
 a coating consisting of water soluble inorganic salts, dye and optionally, at least one of water, fluorescent agent, perfume, carboxymethylcellulose, polyethylene glycol, polyvinyl alcohol, polyethylene imine, ethoxylated polyethylene imine, water soluble polyester polymer, polycarboxylate, polyacrylate, maleic/acrylic acid copolymer, lauryl methacrylate/acrylic acid copolymer, enzyme, or enzyme stabilizer; and
 wherein from 40 to 90 wt % of the coated detergent particle is the surfactant;
 wherein the surfactant is selected from anionic surfactant, non-ionic surfactant, and combinations thereof;
 wherein from 1 to 40 wt % of the coated detergent particle is the water soluble inorganic salts;
 wherein from 0.001 to 0.01 wt % of the coated detergent particle is the dye;
 wherein the dye is selected from anionic dyes, non-ionic dyes, and combinations thereof; and
 wherein the perfume is present in the coated detergent particle in an amount from 0.001 to 3 wt %.

2. A coated detergent particle according to claim 1, wherein the dye is selected from acid dyes; disperse dyes and alkoxylated dyes.

3. A coated detergent particle according to claim 1, wherein the dye is selected from those having: anthraquinone; monoazo; bis-azo; xanthene; phthalocyanine; and phenazine chromophores.

4. A coated detergent particle according to claim 3, wherein the dye is selected from those having: anthraquinone and mono-azo chromophores.

5. A coated detergent particle according to claim 1, wherein the dye is selected from non-ionic dyes.

6. A coated detergent particle according to claim 1, wherein the water soluble inorganic salts are configured to act as builders.

7. A coated detergent particle according to claim 6, wherein the water soluble inorganic salt is sodium carbonate.

8. A coated detergent particle according to claim 1, wherein the surfactant consists of: from 15 to 85 wt % on total surfactant of the anionic surfactant and from 5 to 75 wt % on total surfactant of the non-ionic surfactant.

9. A coated detergent particle according to claim 1, wherein the anionic surfactant is present in an amount from 15 to 100 wt % based on total surfactant of which 20 to 30 wt % is sodium lauryl ether sulphate.

10. A coated detergent particle according to claim 1, wherein the anionic surfactant is selected from alkyl benzene sulphonates; alkyl ether sulphates; alkyl sulphates.

11. A coated detergent particle according to claim 10, wherein the anionic surfactant is selected from sodium lauryl ether sulfate with 1 to 3 ethoxy groups, sodium $C_{10}$ to $C_{15}$ alkyl benzene sulphonates and sodium $C_{12}$ to $C_{18}$ alkyl sulphates.

12. A coated detergent particle according to claim 1, wherein the non-ionic surfactant is a 10 to 50 EO non-ionic surfactant.

13. A coated detergent particle according to claim 12, wherein the non-ionic surfactant is the condensation products of aliphatic $C_8$ to $C_{18}$ primary or secondary linear or branched alcohols with 20 to 35 ethylene oxide groups.

14. A coated detergent particle according to claim 1, wherein from 20 to 40 wt % of the coated detergent particle is the water soluble inorganic salts.

15. A coated detergent particle according to claim 14, wherein from 25 to 35 wt % of the coated detergent particle is the water soluble inorganic salts.

16. A coated detergent particle according to claim 1, wherein the water is present in the coated detergent particle in an amount from 1 to 15 wt %.

17. A coated detergent particle according to claim 16, wherein the water is present in the coated detergent particle in an amount from 1 to 5 wt %.

18. A coated detergent particle according to claim 1, wherein the coated detergent particle is present in a detergent formulation in an amount from 80 to 100 wt %, and wherein the detergent formulation is enclosed in a package.

19. A coated detergent particle according to claim 1, wherein the coated detergent particle is present in a detergent formulation in an amount from 90 to 100 wt %, and wherein the detergent formulation is enclosed in a package.

20. A plurality of coated detergent particles according to claim 1, wherein at least 90 to 100% of the coated detergent particles in the x, y and z dimensions are within a 20% variable from the largest to the smallest coated detergent particle.

* * * * *